(12) United States Patent
Bagasra

(10) Patent No.: US 8,285,864 B2
(45) Date of Patent: Oct. 9, 2012

(54) SERVICE DELIVERY SYSTEM USING INTERMEDIARY APPLICATION MANAGEMENT SUBSYSTEM FOR MANAGING SETUP PROVISIONING DELIVERY AND UPDATING OF SERVICES

(75) Inventor: Abbas Bagasra, Concord, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 483 days.

(21) Appl. No.: 12/643,288

(22) Filed: Dec. 21, 2009

(65) Prior Publication Data

US 2011/0153806 A1  Jun. 23, 2011

(51) Int. Cl.
*G06F 15/16* (2006.01)
(52) U.S. Cl. .......................... 709/229; 709/223; 709/220
(58) Field of Classification Search .................. 709/229, 709/223, 220, 203, 238, 228, 227; 717/177; 370/352; 455/412.2; 725/111; 726/29; 705/44
See application file for complete search history.

(56) References Cited

U.S. PATENT DOCUMENTS

| | | | | | |
|---|---|---|---|---|---|
| 2006/0271662 | A1* | 11/2006 | Fritsch et al. | ................. | 709/223 |
| 2007/0086433 | A1* | 4/2007 | Cunetto et al. | ................. | 370/352 |
| 2007/0100981 | A1* | 5/2007 | Adamczyk et al. | ........... | 709/223 |
| 2008/0028061 | A1* | 1/2008 | Hartman et al. | ............... | 709/223 |
| 2008/0059375 | A1* | 3/2008 | Abifaker | ........................ | 705/44 |
| 2008/0178298 | A1* | 7/2008 | Arai et al. | ........................ | 726/29 |
| 2008/0235746 | A1* | 9/2008 | Peters et al. | ................... | 725/111 |
| 2009/0276771 | A1* | 11/2009 | Nickolov et al. | .............. | 717/177 |
| 2009/0292766 | A1* | 11/2009 | Morris | .......................... | 709/203 |
| 2009/0300189 | A1* | 12/2009 | Takeda et al. | ................... | 709/227 |
| 2010/0121960 | A1* | 5/2010 | Baniel et al. | ................... | 709/228 |
| 2011/0117888 | A1* | 5/2011 | Klein et al. | ................. | 455/412.2 |
| 2011/0264824 | A1* | 10/2011 | Venkata Subramanian et al. | ............................ | 709/238 |

* cited by examiner

*Primary Examiner* — Le H Luu

(57) ABSTRACT

Exemplary service delivery platform and management systems and methods are described herein. An exemplary method includes an intermediary application management subsystem, which is configured to communicate with an end-user access device and with an application server that is configured to deliver a service to the end-user access device, receiving a software application from a developer, the software application configured to be executed by the end-user access device to access the service delivered by the application server, setting up the service for selection by the end-user access device, receiving a request to subscribe to the service delivered by the application server, the request initiated by the end-user access device, and provisioning the service for delivery from the application server to the end-user access device. Corresponding systems and methods are also disclosed.

22 Claims, 11 Drawing Sheets

SERVICE DELIVERY SYSTEM USING INTERMEDIARY APPLICATION MANAGEMENT SUBSYSTEM FOR MANAGING SETUP PROVISIONING DELIVERY AND UPDATING OF SERVICES

BACKGROUND INFORMATION

Certain computing devices are designed primarily to access one or more services via an access network. For example, set-top boxes typically provide subscribers with access to television, pay-per-view media, video-on-demand media, digital video recorder ("DVR"), and Internet access services via an access network. As another example, mobile phones typically provide subscribers with access to voice communication, text messaging, and data services (e.g., e-mail services and Internet access services) via an access network.

Traditionally, managed subscription services accessible by a set-top box or a mobile phone via an access network may be limited to those services provided by a service carrier through which subscribers subscribe to obtain access to the services. The service carrier may be reluctant to provide access to unmanaged services provided by third parties. One reason for this reluctance is the potential negative impact that unmanaged services can have on the managed services provided by the service carrier. For example, an unmanaged third-party service accessed by a set-top box or mobile phone may tie up resources needed to maintain quality-of-service standards for a service-carrier-provided service accessed by the set-top box or mobile phone. Accordingly, the quality of services provided by a service carrier may be unacceptably compromised.

Unfortunately, a decrease in service quality and/or a limitation on the services that may be accessed by an end-user device may be viewed negatively by some service subscribers and/or potential service subscribers. Hence, it is desirable, to both subscribers and service carriers, to maximize the quantity and quality of the services that can be accessed via an access network by subscribers using set-top boxes, mobile phones, or other computing devices.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary service delivery platform and management systems and methods are described herein. As described in more detail below, in certain embodiments, a service delivery platform (e.g., a subscription television service delivery platform or a subscription mobile phone service delivery platform) that is used primarily to deliver one or more services provided by a service carrier to an end-user access device may be leveraged and used to provide one or more additional services (e.g., third-party-provided services) to the end-user device under the control and management of the service carrier. To this end, an intermediary application management subsystem may be implemented (e.g., by the service carrier) and configured to interface with the service delivery platform. The intermediary application management subsystem may be further configured to interface with the end-user access device and an application server configured to deliver an additional service to the end-user access device. Through these interfaces with the service delivery platform, the end-user access device, and the application server, the intermediary application management subsystem may manage a life cycle of a service provided by the application server, such as by managing setup, provisioning, delivery, updating, and/or termination of a service provided by the application server. The intermediary application management subsystem may provide an application development and execution framework configured to attract developers and applications (e.g., software applications) that may be executed by the end-user access device to access one or more services. Accordingly, the intermediary application management subsystem may facilitate an expansion of the quantity and quality of services accessible by the end-user access device.

Exemplary service delivery platform and management systems and methods will now be described with reference to the accompanying drawings.

Figure 1:
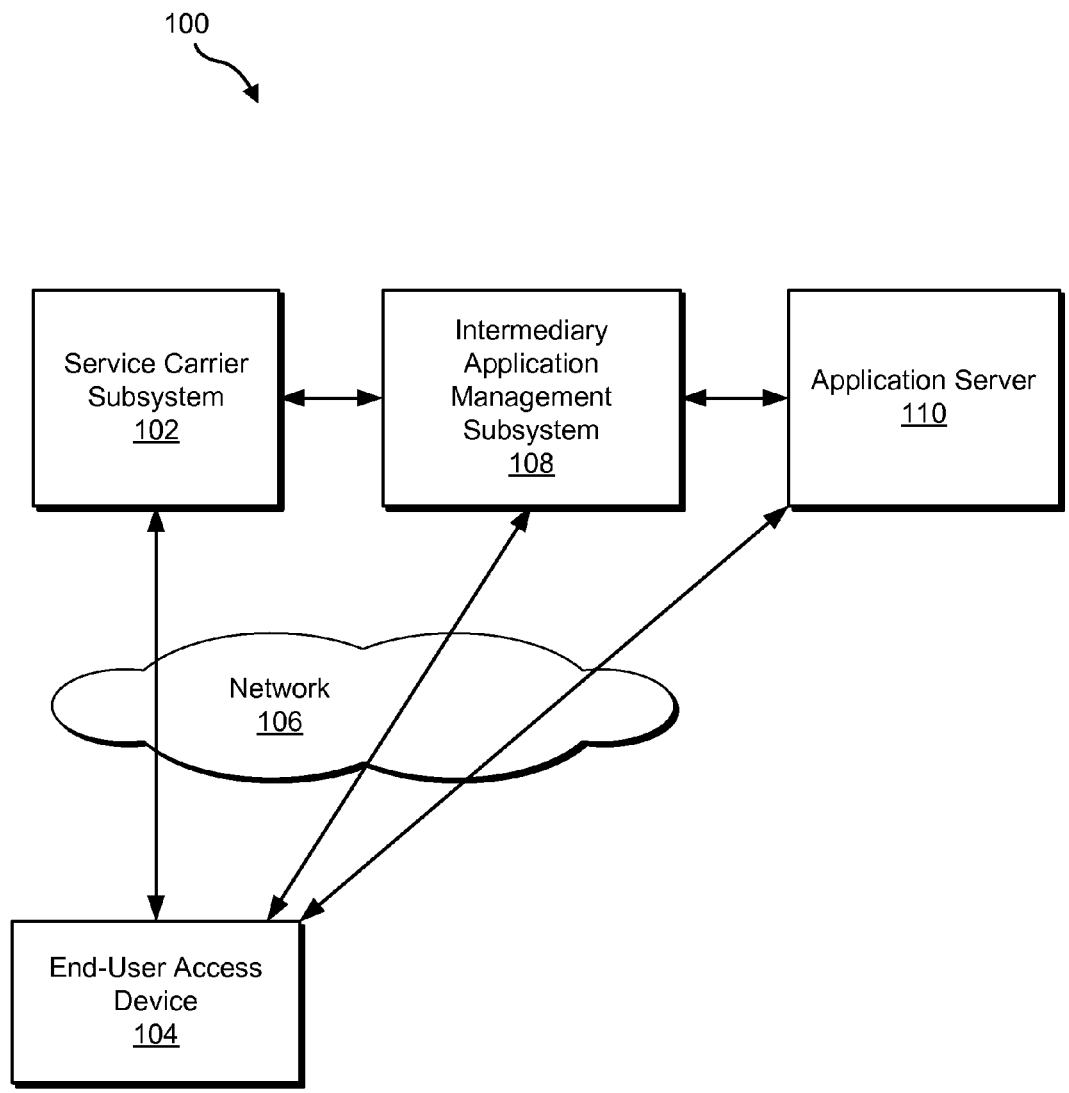
FIG. 1 illustrates an exemplary service delivery system.

FIG. 1 illustrates an exemplary service delivery system 100 (or simply "system 100"). As shown in FIG. 1, system 100 may include a service carrier subsystem 102 configured to communicate with an end-user access device 104 (or simply "end-user device 104" or "access device 104") via a network 106. In addition, system 100 may include an intermediary application management subsystem 108 (or simply "management subsystem 108") and an application server 110 each configured to communicate with access device 104 via network 106. Management subsystem 108 may be configured to communicate with service carrier subsystem 102 and application server 110 directly, via network 106, or in any other suitable way. Each of the components of system 100 will now be described in more detail.

Service carrier subsystem 102 may be configured to provide one or more services (e.g., subscription services) for access by access device 104 via network 106. To this end, service carrier subsystem 102 may include one or more components (e.g., server devices, telecommunications equipment, network devices, backend facilities, etc.) configured to deliver one or more services to access device 104. Services delivered by service carrier subsystem 102 to access device 104 may be referred to as "base services." Examples of services that may be included in a base set of services delivered by service carrier subsystem 102 may include, but are not limited to, television, pay-per-view media, video-on-demand media, digital video recorder ("DVR"), Internet access, voice communication, text messaging, data, and e-mail services. In certain examples, service carrier subsystem 102 may be configured to deliver a base set of services related to a subscription service package such as a subscription television service package, a subscription mobile phone service package, and/or a subscription Internet access service package.

Service carrier subsystem 102 may include one or more backend facilities configured to support delivery of base services to access device 104. Examples of such backend facilities may include, without limitation, a billing facility, a subscriber data management facility, a subscription data management facility, an access device management facility, a service provisioning facility, and a service selection and/or management portal facility. As described in more detail further below, management subsystem 108 may be configured to leverage one or more of the backend facilities of service carrier subsystem 102 to manage delivery of a service from application server 110 to access device 104.

Network 106 may include one or more networks or types of networks capable of carrying communications and/or data signals between service carrier subsystem 102 and access device 104 to support delivery of services from service carrier subsystem 102 to access device 104. For example, network 106 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network (e.g., a Verizon® FIOS® network or a Verizon® 4 G LTE network), the Internet, a wide area network, any other suitable network, and any combination or sub-combination of these networks.

Service carrier subsystem 102 and access device 104 may communicate over network 106 using any suitable communication technologies, devices, media, and protocols supportive of remote data communications, including, but not limited to, data transmission media, communications devices, network devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), Ethernet, and any other suitable communications technologies, devices, media, and protocols.

Access device 104 may include one or more computing devices configured to access one or more services delivered by service carrier subsystem 102 via network 106. For example, access device 104 may include a set-top box, a modem, a router (e.g., a broadband home router), a communications device, a mobile device (e.g., a mobile phone device), a handheld device, a personal computer, a phone device (e.g., Verizon Hub device), a personal-digital assistant device, a gaming device, an entertainment device, a DVR device, a television device, a media player device, and/or any other device configured to access one or more services provided by service carrier subsystem 102. In certain embodiments, access device 104 may include one or more computing devices located within a subscriber premises (e.g., a subscriber's home or business premises). For example, access device 104 may include a broadband home router and/or a set-top box located within a subscriber's home.

Service carrier subsystem 102, access device 104, and network 106 may provide a service delivery platform that supports delivery of one or more base services provided by service carrier subsystem 102 from service carrier subsystem 102 to access device 104. For example, the platform may include a subscription television service delivery platform that supports delivery of subscription television services or a subscription mobile phone service delivery platform that supports delivery of subscription mobile phone services. These examples are illustrative only. System 100 may include other platforms supporting delivery of other base services from service carrier subsystem 102 to access device 104 via network 106.

The platform used for delivery of base services from service carrier subsystem 102 to access device 104 may be leveraged to expand the services that are accessible by access device 104. For example, access device 104 may be configured to access one or more additional services provided by application server 110 under the management and/or control of management subsystem 108. To this end, access device 104 may be configured to access one or more base services provided by service carrier subsystem 102 and one or more additional services provided by application server 110.

Figure 2:
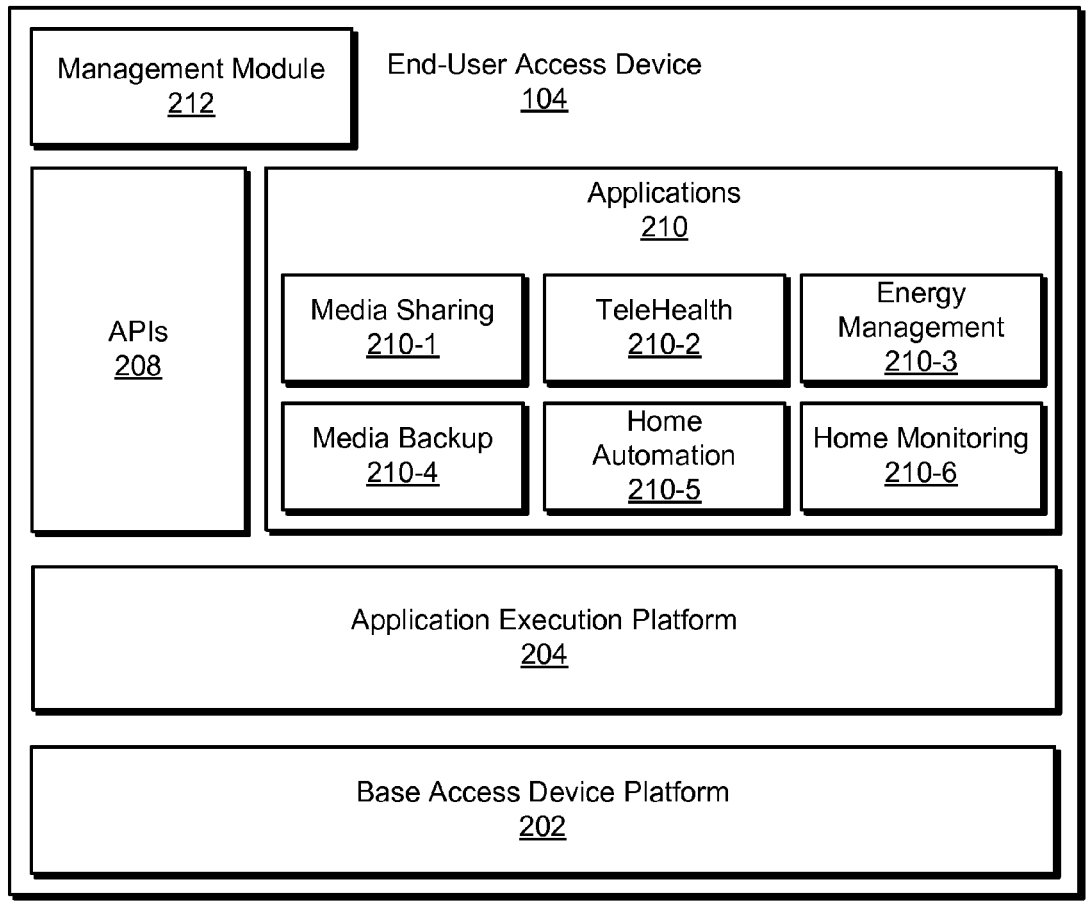
FIG. 2 illustrates exemplary components of an end-user access device.

FIG. 2 shows exemplary components of end-user access device 104 configured to access one or more base services provided by service carrier subsystem 102 and one or more additional services provided by application server 110. Access device 104 may be managed by service carrier subsystem 102 and/or by a service carrier operating service carrier subsystem 102. In addition, as described in more detail further below, access device 104 may be managed by management subsystem 108.

As shown in FIG. 2, access device 104 may include a base access device platform 202 that enables access device 104 to access one or more base services delivered by service carrier subsystem 102 via network 106. Base access device platform 202 may include any components that support access of base services by access device 104. In certain embodiments, for example, base access device platform 202 may include hardware, firmware, middleware, and/or software that enables access device 104 to access one or more base services provided by service carrier subsystem 102 via network 106. For instance, base access device platform 202 may include components of a set-top box, mobile phone, or other computing device configured to access one or more base services provided by service carrier subsystem 102 via network 106.

In addition, access device 104 may be configured to provide a platform for runtime execution of one or more software applications installed on access device 104 to provide access device with access to one or more additional services associated with the applications. As shown in FIG. 2, access device 104 may include an application execution platform 204 and application program interfaces ("APIs") 208 configured to support runtime execution of one or more applications 210 (e.g., applications 210-1 through 210-6) installed on access device 104. In certain embodiments, APIs 208 may be exposed to one or more developers such that application execution platform 204 is open for application development and execution. In certain embodiments, application execution platform 204 may provide an application execution environment in accordance with a standard defined by one or more standards organizations. For example, application execution platform 204 may include a Java virtual machine and an OSGi framework specified by OSGi Alliance, or another Java-based application execution platform that can be remotely managed (e.g., by management subsystem 108).

Applications 210 installed on access device 104 may include software applications and may be executed by access device 104 under the remote control and management of management subsystem 108. Thus, as described in more detail further below, management subsystem 108 may control execution of applications 210 by access device 104. Accordingly, an operator of management subsystem 108, which may include the service carrier operating service carrier subsystem 102 in some examples, may be able to maintain security and/or quality of service standards associated with execution of applications 210 by access device 104 to access one or more services associated with application 210.

In certain embodiments, access device 104 may include a computing device located within a subscriber premises and configured to interface with one or more other devices located within the subscriber premises and/or connected to a local area network at the subscriber premises. Accordingly, an application 210 executing on access device 104 may control operation of one or more other devices via a local area network (e.g., a home network). For example, a home monitoring application executing on an access device 104 such as a home router may communicate with and control one or more surveillance cameras via a home network at a subscriber's home. In such embodiments, one or more attributes of access device 104, such as connectivity to a local area network and/or location at a subscriber premises, may be leveraged to deliver a particular service such as a home monitoring service in a managed and controlled manner.

As mentioned, services delivered to access device 104 may be managed remotely by management subsystem 108. To this end, access device 104 may include a management module 212 configured to provide an interface for communications between access device 104 and management subsystem 108 for remote management of services and/or associated applications 210. Management module 212 may employ any technologies suitable for supporting remote communications with management subsystem 108. In certain embodiments, for example, management module 212 may include an agent configured to operate in accordance with a TR-69 protocol and an agent configured to operate in accordance with an OSGi standard defined by OSGi Alliance to support communications with management subsystem 108. Such communications may be performed at a service management layer that is separate from a device management layer used for remote management of access device 104 by service carrier subsystem 102. This may allow for a restart or reboot of a service accessed by access device 104 without rebooting access device 104. In addition, overloading of a device management facility of service carrier subsystem 102 may be avoided by separating management of services from management of access device 104.

As mentioned, management subsystem 108 may be configured to remotely manage setup, distribution, provisioning, delivery, updating, and/or termination of one or more services accessible by access device 104. To this end, management subsystem 108 may be configured to manage, setup, distribution, provisioning, execution, updating, and/or removal of one or more applications that may be executed by access device 104 to access one or more services corresponding to the applications.

Figure 3:
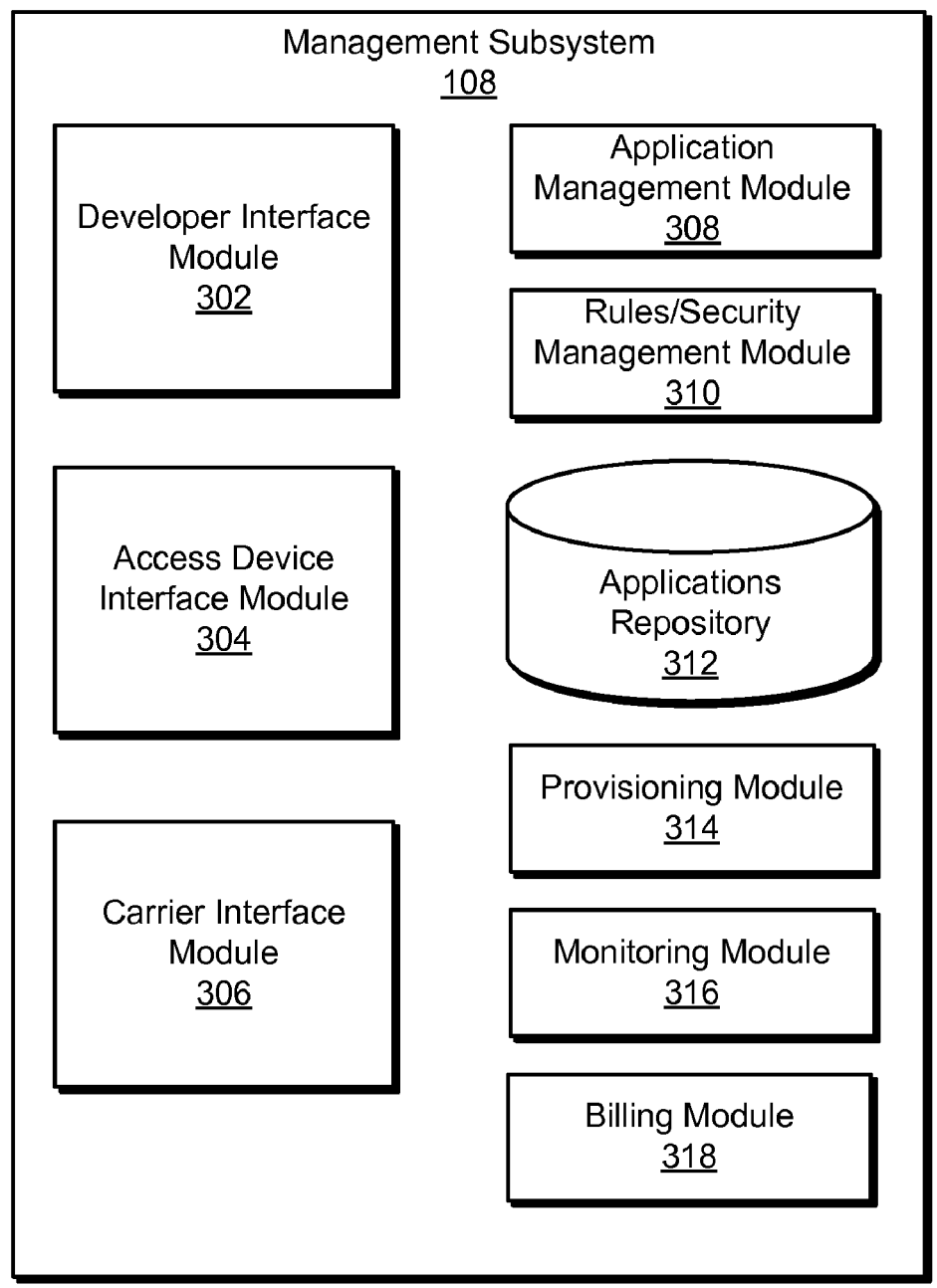
FIG. 3 illustrates exemplary components of an intermediary application management subsystem.

FIG. 3 illustrates exemplary components of management subsystem 108. As shown, the components may include, without limitation, a developer interface module 302, an access device interface module 304, a carrier interface module 306, an application management module 308, a rules and/or security ("rules/security") management module 310, an applications repository 312, a provisioning module 314, a monitoring module 316, and a billing module 318. Any suitable communication technologies, including any of the communication technologies mentioned herein, may be employed to facilitate communications between the components of management subsystem 108 shown in FIG. 3. Each of the components of management subsystem 108 will now be described in more detail.

Developer interface module 302 may be configured to provide one or more interfaces for communications between management subsystem 108 and one or more computing devices associated with developers of applications for execution by access device 104. For example, developer interface module 302 may be configured to provide an interface for communications with application server 110, which may be hosted by an application developer in some examples. Access device interface module 304 may be configured to provide one or more interfaces for communications between management subsystem 108 and one or more access devices such as access device 104. Carrier interface module 306 may be configured to provide one or more interfaces for communications between management subsystem 108 and service carrier subsystem 102. For example, carrier interface module 306 may be configured to interface with one or more backend facilities of service carrier subsystem 102, including backend provisioning, subscriber management, access device management, and/or billing facilities of service carrier subsystem 102.

Such interfaces allow management subsystem 108 to function as an intermediary to control delivery of a service from application server 110 to access device 104 in a manner that leverages the service delivery platform used to support delivery of base services from service carrier subsystem 102 to access device 104. In particular, management subsystem 108 may leverage one or more capabilities of access device 104 and/or service carrier subsystem 102 to control, support, and/or manage delivery of a service from application server 110 to access device 104. For example, management subsystem 108 may leverage backend provisioning, subscriber management, access device management, and/or billing facilities of service carrier subsystem 102 and/or one or more attributes of access device 104 to support and manage delivery of a service from application server 110 to access device 104.

Interface modules 302-306 of management subsystem 108 may employ any suitable technologies for interfacing with access device 104, application server 110, and service carrier subsystem 102. In certain embodiments, management subsystem 108 may comprise a server device configured to communicate remotely (e.g., via network 106 and/or another network) with access device 104, application server 110, and/or service carrier subsystem 102.

Developer interface module 302 may be configured to expose one or more APIs to one or more developers to facilitate development of software applications for execution by access device 104. The exposure of APIs may be accomplished in any suitable way. In certain embodiments, for example, developer interface module 302 may be configured to provide an application development portal (e.g., an HTTP portal) through which a developer may be able to access exposed APIs and submit (e.g., upload) data representative of software applications and/or updates to software applications.

Exposure of APIs to developers may facilitate an open application development environment configured to attract a broad set of third-party and/or in-house application developers to develop software applications for execution by access device 104. Consequently, a base service offering of a service carrier operating service carrier subsystem 102 may be expanded to include one or more additional managed services that may be accessed by access device 104 executing one or more software applications. The additional services may be provided by third-party developers and/or in-house developers associated with the service carrier.

Exposed APIs may include any APIs useful for development of a software application that may be executed by access device 104. For example, the APIs may include one or more runtime environment APIs that are employed by access device 104 and expose the capabilities of access device 104 to developers. An example of a runtime environment API may include an API that provides access to a Wi-Fi web key that can be utilized by a software application for automatic configuration. As another example, the APIs may include one or more notification APIs configured to allow developers (e.g., third-party developers) to register to receive notification messages from management subsystem 108. An example of a notification API includes an API that allows a developer to register to receive notification of an initiation and/or a termination of a service subscription. As yet another example, the APIs may include one or more infrastructure APIs configured to allow developers to register to receive notification messages from service carrier subsystem 102 (e.g., one or more service carrier backend facilities). Examples of infrastructure APIS include APIs that allow a developer to register to receive notification messages from a carrier backend billing facility and/or a carrier backend provisioning facility.

Developer interface module 302 may be configured to receive data representative of a software application from a developer. The software application may be received by developer interface module 302 in any suitable way. For example, developer interface module 302 may receive data representative of the software application through a developer portal provided by developer interface module 302. Accordingly, a developer may provide a software application to management subsystem 108 by uploading the software application to the developer portal.

The software application received by developer interface module 302 may be associated with a service delivered by application server 110. For example, access device 104 may access the service delivered by application server 110 by installing and executing the software application. In certain examples, a software application may be associated with multiple services, or a service may be associated with multiple applications. For example, a home monitoring service may be associated with a combination of multiple software applications such as a video monitoring application, an e-mail alert application, and a home lighting control application.

The software application may include any data that may facilitate or otherwise be used to support managed installation, execution, upgrading, and/or termination of the software application by access device 104. For example, the software application may be received as a package that includes executable code as well as application rules data specifying one or more dependencies (e.g., hardware and/or firmware dependencies) of the software application. As described in more detail further below, the application rules data may be used to match software applications with access devices capable of executing the software applications based on the specified dependencies of the software applications. This may be accomplished by comparing application dependencies specified by the application rules data to access device data maintained by a backend facility of service carrier facility 102. Rules/security management module 310 may be configured to apply policies and/or dependencies specified in application rules data as part of management of software application and corresponding services. For example, an execution of a software application version may be dependent on certain hardware and/or firmware access device 104. Rules/security management module 310 may utilize the specified dependencies to ensure that the software application is only provisioned on access devices such as access device 104 that contains the hardware and/or firmware to support the dependencies of the software application.

In certain embodiments, a software application package may include one or more executable software code bundles. Each code bundle may be associated with a set of one or more rules specifying dependencies of the code bundle. Code bundles may be reused for multiple software applications.

Application management module 308 may be configured to manage software applications, including the software application received by developer interface module 302 as described above. For example, application management module 308 may be configured to selectively approve a software application received by developer interface module 302 for setup and distribution to access device 104 and/or one or more other access devices via network 106. The selective approval may be based on one or more predefined conditions. In certain embodiments, for example, management subsystem 108 may be configured to mark the software application as approved for setup and distribution based on input provided by an operator of management subsystem 108. The software application may be marked as approved for distribution in any suitable way such as by attaching a digital approval certificate to the software application. In certain embodiments, executable software code bundles may be individually approved and/or rejected on a granular level.

Once marked as approved for distribution, a software application may be set up and made accessible to one or more access devices via network 106. To this end, application management module 308 may store data representative of the software application in applications repository 312. A matrix of version and other dependencies of the software application may also be stored in applications repository 312. The matrix may be used by management subsystem 108 for various operations, including provisioning the software application for installation and execution by access device 104, updating and provisioning the updated software application on access device 104, and removing the software application from access device 104.

Setup of the software application may also include making the software application accessible to access device 104 through a service selection portal, which may be provided by access device interface module 304 or service carrier subsystem 102. As an example, service carrier subsystem 102 may provide a portal (e.g., a web portal) that may be accessed by access device 104 and used to indicate a selection of one or more services to which a subscriber may wish to have access (e.g., by subscribing to the services). Carrier interface module 306 may be configured to communicate with the portal provided by service carrier subsystem 102 such as by sending a notification message to notify the portal that a software application has been approved for setup and distribution. The portal may add information descriptive of a service associated with the software application to the portal. A user of access device 104 may then utilize access device 104 to discover the service and provide input to the portal to initiate a request to access the service. In certain embodiments, the request may include a request to subscribe to the service, which may be delivered by application server 110. The portal may provide data representative of the request for the service to carrier interface module 306, which may receive and initiate processing of the request by management subsystem 108.

The above-described operations for receiving, approving, and setting up a software application for distribution may be repeated for other software applications such that management subsystem 108 may aggregate and provide access to developer-provided software applications associated with services that may be delivered to access device 104.

Figure 4:
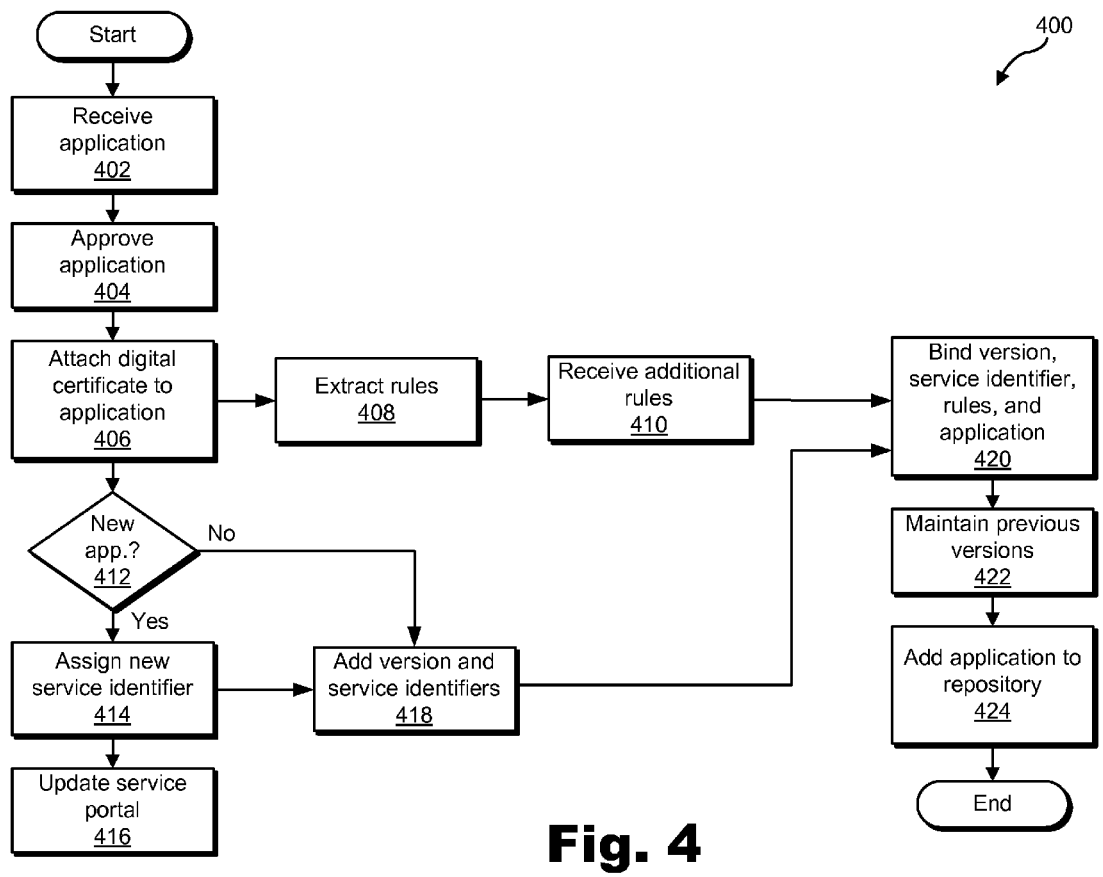
FIG. 4 illustrates an exemplary service setup method.

FIG. 4 illustrates and exemplary service setup method 400. While FIG. 4 illustrates exemplary steps according to one embodiment, other embodiments may omit, add to, reorder, and/or modify any of the steps shown in FIG. 4. In certain embodiments, one or more of the steps shown in FIG. 4 may be performed by one or more components of management subsystem 108.

In step 402, an application is received. For example, developer interface module 302 may receive data representative of a software application package from a developer as described above.

In step 404, the application software package is approved. For example, application management module 308 may approve the software application package in any of the ways described above. In certain embodiments, application management module 308 may attach a digital certificate to the approved software application package in step 406.

Processing may continue from step 406 to step 408. In step 408, application rules are extracted from the software application package. In step 410, additional application rules may be received. For example, carrier interface module 306 may receive input from an operator of management subsystem 108 defining additional rules to be applied to the software application.

Additional processing may continue from step 406 to step 412 as shown in FIG. 4. In step 412, a determination may be made as to whether the received software application is a new software application (rather than an update to a software application stored in applications repository 312). The determination may be made in any suitable way. For example, application management module 308 may search applications repository 312 for a match indicating that the received software application is already stored in applications repository 312.

If it is determined in step 412 that the received software application is a new software application, processing continues at step 414. In step 414, a new service identifier is assigned to the software application. For example, application management module 308 may generate and assign a new service identifier to the software application. The new service identifier may be used to identify a new service associated with the new software application.

In step 416, a service portal is updated. The update may include an addition of data representative of a new service associated with the new software application such that a subscriber accessing the service portal may discover and request access to the new service. For example, carrier interface module 306 may send data representative of an update to a service selection portal provided by service carrier subsystem 102 as described above.

If it is determined at step 412 that the received software application is not a new software application, or after a new service identifier is assigned to a new software application at step 414 if the software application is a new software application, processing continues at step 418. In step 418, version and service identifiers are added. Step 418 may include adding version and service identifiers to one or more data objects associated with the software application.

In step 420, the version identifier, service identifier, application rules, and software application are bound together. The binding may be performed in any way suitable to associate the version identifier, service identifier, application rules, and software application together such that management subsystem 108 may control provisioning, execution, updating, and removal of the software application based on the version identifier, service identifier, and application rules.

In step 422, previous versions of the software application are maintained. Accordingly, any previous versions of the software application may remain accessible in applications repository 312. In certain examples, step 422 may include archiving previous versions of the software application.

In step 424, the software application is added to applications repository 312. At this point, the software application has been successfully set up and is available for access by one or more access devices such as access device 104. Consequently, a service associated with the software application is also accessible to one or more access devices such as access device 104.

After a software application and a corresponding service have been set up for distribution and access as described above, management subsystem 108 may receive a request for the service. For example, the request may be received by carrier interface module 306 from the service selection portal described above. In response to the request for the service, management subsystem 108 may provision the service, which may include provisioning the software application associated with the service.

Provisioning module 314 may be configured to control and/or manage provisioning of the software application and the service associated with the software application. In certain examples, the provisioning may include one or more operations configured to facilitate installation and execution of the software application by access device 104 such that access device 104 gains access to the corresponding service provided by application server 110. For instance, provisioning may include access device interface module 304 transmitting data representative of the software application to access device 104 for installation and execution by access device 104. Data representative of the software application may be transmitted to access device 104 via network 106 using any suitable data transmission technologies. Access device 104 may receive, install, and execute the software application under the control and/or management of management subsystem 108.

As part of provisioning the software application, rules/security management module 310 may ensure that the software application is provisioned only on an access device 104 that is capable of supporting the dependencies of the software application. If rules/security management module 310 determines that access device 104 is not capable of properly executing of the software application, provisioning module 314 may initiate one or more operations for updating or replacing access device 104. For instance, provisioning module 314 may determine that access device 104 is not configured to properly execute the software application and may initiate a transmission of a request to a backend provisioning facility of service carrier subsystem 102 to request that the backend provisioning facility perform one or more provisioning operations such as placing an order for a replacement or an upgrade of access device 104. The backend provisioning facility may respond by initiating a process for shipping a compatible access device to the subscriber or by initiating a download and installation of updated firmware on access device 104, for example.

Provisioning of the selected service may further include developer interface module 302 transmitting a notification message to application server 110. The message may notify application server 110 of an initiation of a subscription to the service by access device 104 and/or a completion of one or more operations for provisioning the service and/or the corresponding software application. Application server 110 may receive the notification message and respond by delivering or otherwise making the service accessible to access device 104.

Provisioning of the selected service may further include carrier interface module 306 communicating with service carrier subsystem 102 to leverage one or more other backend facilities of service carrier subsystem 102 for use in provisioning the service. As an example, carrier interface module 306 may send a message to a billing backend facility, a subscriber management backend facility, and/or an access device management backend facility of service carrier subsystem 102. The message may contain data to be used by one or more of the backend facilities to update backend billing, subscriber, and/or access device information. For example, a backend billing facility may be updated with billing information for billing a subscriber for the provisioned service, a subscriber management backend facility may be updated with information indicating a subscriber subscribes to the service, and an access device management backend facility may be updated with information indicating that access device 104 has installed the software application to gain access to the service.

Figure 5:
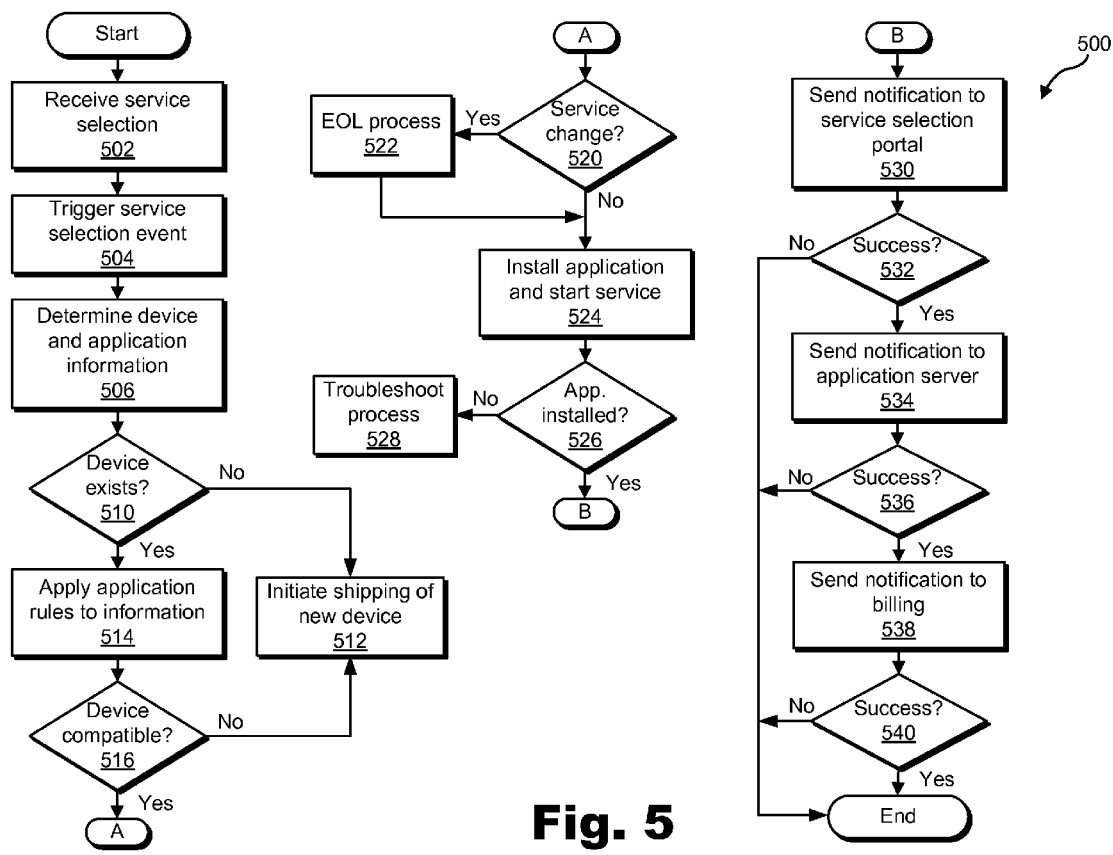
FIG. 5 illustrates an exemplary service provisioning method.

FIG. 5 illustrates and exemplary service provisioning method 500. While FIG. 5 illustrates exemplary steps according to one embodiment, other embodiments may omit, add to, reorder, and/or modify any of the steps shown in FIG. 5. In certain embodiments, one or more of the steps shown in FIG. 5 may be performed by one or more components of management subsystem 108.

In step 502, a service selection is received. For example, management subsystem 108 may receive data representative of a service selection provided by a subscriber via a service selection portal as described above.

In step 504, a service selection event is triggered in response to the service selection received in step 502. For example, application management module 308 may trigger a service selection event to initiate one or more operations for provisioning the selected service.

In step 506, device and application information is determined. For example, management subsystem 108 may determine device and application information associated with an access device 104 of a subscriber who provided the service selection. Such information may include specifications for the access device 104 and applications installed on the access device 104. In certain examples, management subsystem 108 may maintain and determine such information internally. In other examples, carrier interface module 306 may communicate with one or more backend facilities of service carrier subsystem 102 to access and determine device and application information in step 506.

In step 510, a determination is made as to whether an access device exists. The determination may be made based on the device and application information determined in step 506. For example, application management module 308 may determine whether a subscriber who provided the service selection is associated with an access device 104 that may access the selected service.

If it is determined in step 510 that an access device 104 does not exist, a process for shipping a new access device to the subscriber may be initiated in step 512. The shipping process may be initiated in any suitable way. For example, carrier interface module 306 may communicate with a backend provisioning facility of service carrier subsystem 102 to request that a new device be shipped to the subscriber.

If it is determined in step 510 that an access device 104 does exist, in step 514 application rules associated with a software application corresponding to the selected service are applied to the device and application information determined in step 506. For example, application management module 308 may compare application rules to the determined device and application information.

In step 516, a determination is made as to whether an access device 104 is compatible to access the selected service. The determination may be based on the application of application rules to device and application information performed in step 514.

If it is determined at step 516 that access device 104 is not compatible with the selected service, a process for shipping a new device to the subscriber is initiated in step 518. Conversely, if it is determined at step 516 that access device 104 is compatible with the selective service, processing continues at step 520.

In step 520, a determination is made as to whether the selected service is a service change. As used herein, a "service change" may refer to a service selection that is configured to modify an existing service that is already accessible to access device 104. For example, a service change may include an upgrade in a service that is accessible to access device 104. To illustrate, access device may have been previously configured to access a home monitoring service. An example of a service change to the home monitoring service may include a request provided by a subscriber to upgrade the service to record captured video.

If it is determined at step 520 that the service selection is a service change, and end-of-life ("EOL") process is performed at step 522. The EOL process may be configured to terminate access to a previous service by access device 104 to prepare for provisioning of the service change for access by access device 104. An example of an EOL process is described further below in reference to FIG. 8. After completion of the EOL process in step 522 if the service selection is a service change, or after a determination that the service selection is not a service change in step 520, processing continues at step 524.

In step 524, a software application associated with the selected service is installed on access device 104 and the service is started. Step 524 may be performed in any of the ways described above. For example, access device interface module 304 may provide data representative of the software application to access device 104 for installation and execution.

In step 526, a determination is made as to whether the software application is successfully installed on access device 104. The determination may be made by management subsystem 108 in any suitable way.

If it is determined at step 526 that the software application is not successfully installed on access device 104, a troubleshooting process may be executed in step 528. Conversely, if it is determined at step 526 that the software application is successfully installed on access device 104, processing may continue at step 530.

In step 530, a notification is sent to a service selection portal. For example, carrier interface module 306 may transmit a notification message to a service selection portal provided by service carrier subsystem 102. The notification to the service selection portal may be configured to notify the subscriber who provided the service selection that the software application has been successfully installed on access device 104.

In step 532, a determination is made as to whether the service selection portal was successfully notified in step 530. If the service selection portal was not successfully notified in step 530, processing ends. Conversely, if the service selection portal was successfully notified in step 530, processing continues from step 532 to step 534.

In step 534, a notification message is sent to application server 110. For example, developer interface module 302 may transmit a notification message to application server 110 to notify application server 110 of an initiation of a subscription to the selected service and/or of a completion of a provisioning of the selected service and/or a corresponding software application, as described above.

In step 536, a determination is made as to whether application server 110 was successfully notified in step 534. If the application service was not successfully notified in step 536, processing ends. Conversely, if application server 110 was successfully notified in step 534, processing continues from step 536 to step 538.

In step 538, a notification message is sent to billing. For example, application management module 308 and/or provisioning module 314 may inform billing module 318 of an initiation of a subscription to the selected service and/or of a successful provisioning of the selected service and/or corresponding software application. As another example, carrier interface module 306 may transmit a notification message to a backend billing facility of service carrier subsystem 102 to inform the backend billing facility of an initiation of a subscription to the selected service and/or of a successful provisioning of the selective service and/or corresponding software application.

In step 540, a determination is made as to whether billing was successfully notified in step 538. If billing was not successfully notified in step 540, processing ends. Conversely, if billing was successfully notified in step 538, provisioning of the selected service is successful and processing ends.

Once a service has been successfully provisioned, delivery of the service from application server 110 to access device 104 may begin. The service may be delivered from application server 110 to access device 104 without going through management subsystem 108. However, management subsystem 108 may control and/or manage the delivery of the service.

Figure 6:
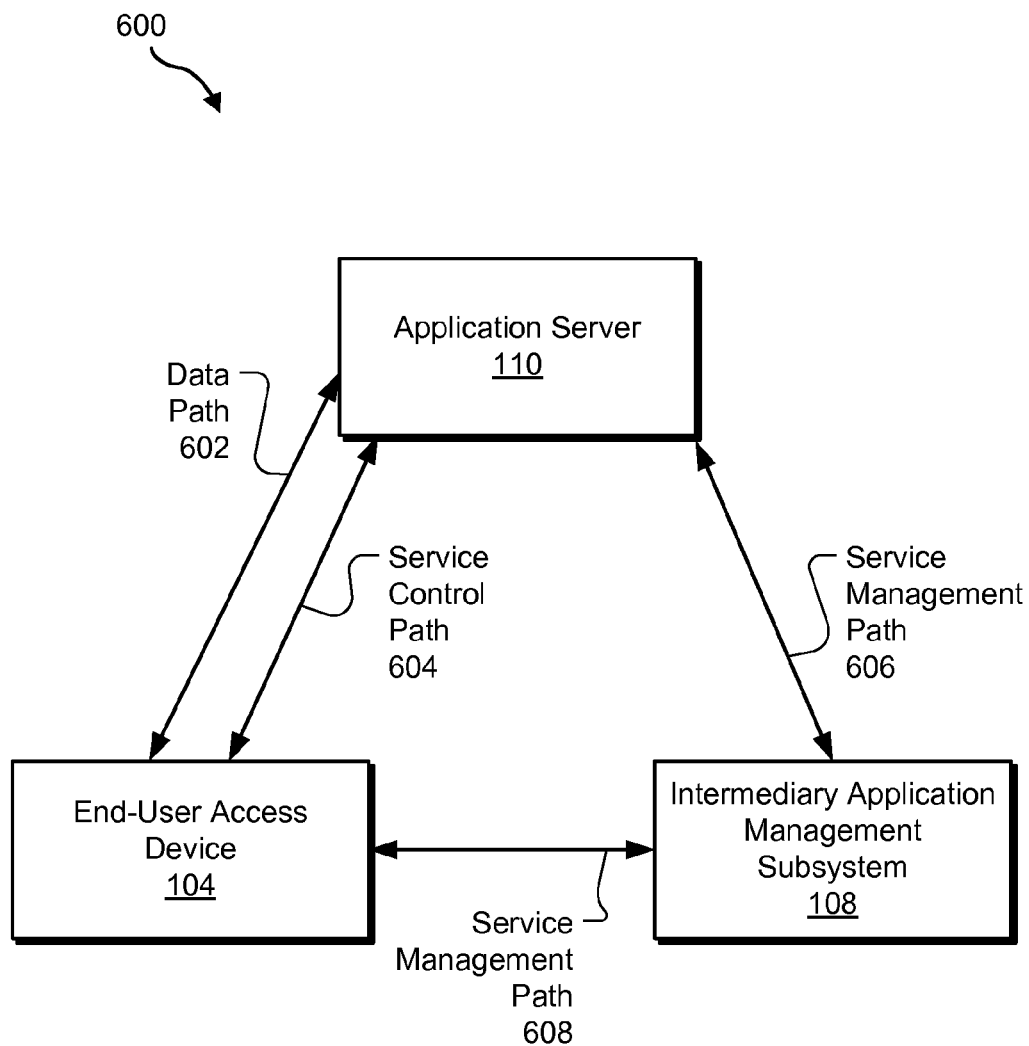
FIG. 6 illustrates exemplary communication paths between an application server, an end-user access device, and an intermediary application management subsystem.

FIG. 6 illustrates exemplary communication paths between application server 110, access device 104, and management subsystem 108. As shown, a data path 602 and a service control path 604 associated with delivery of a service from application server 110 to access device 104 may travel between application server 110 and access device 104 without going through management subsystem 108. Management subsystem 108 and application server 110 may communicate with one another via a service management path 606, and management subsystem 108 and access device 104 may communicate with one another via another service management path 608. Accordingly, management subsystem 108 may communicate with application server 110 and access device 104 to manage delivery of a service from application server 110 to access device 104. The data path configuration shown in FIG. 6 is configured to provide a scalable, managed service delivery platform at least because actual service delivery data and control paths do not go through management subsystem 108.

As mentioned, management subsystem 108 may be configured to control delivery of a service from application server 110 to access device 104. To this end, monitoring module 316 may be configured to monitor delivery of the service and/or execution of a software application associated with the service. Monitoring module 316 of management subsystem 108 shown in FIG. 3 may be configured to monitor one or more attributes associated with execution of the software application and/or delivery of the service. The monitored attributes may be used by management subsystem 108 to control service delivery and/or application execution.

As an example, monitoring module 316 may be configured to monitor usage of resources of access device 104. Management subsystem 108 may utilize data gathered from the monitoring to control application execution and/or service delivery based on resource usage of access device 104. For instance, a resource usage threshold may be predefined and may be associated with a minimum quality of service level for a service accessed by access device 104. Based on monitored resource usage as compared to the resource usage threshold, management subsystem 108 may control application execution and/or service delivery in a manner designed to maintain the minimum quality of service level. For example, management subsystem 108 may block and/or throttle application execution and/or access to a service delivered by application server 110 in order to keep a minimum amount of resources available for one or more other applications and/or services (e.g., base services provided by service carrier subsystem 102). Accordingly, management subsystem 108 may provide access to third-party-provided services without compromising the quality of base services provided by a service carrier.

Billing module 318 may be configured to generate billing data associated with application execution and/or service delivery. In certain embodiments, carrier interface module 306 may provide the billing data generated by billing module 318 to service carrier subsystem 102 for processing and use by a backend billing facility of service carrier subsystem 102 to bill subscribers. Accordingly, management subsystem 108 may leverage the backend billing facility of service carrier module 102 to bill for provisioning and/or delivery of a service (e.g., a third-party-provided service) from application server 110 to access device 104. In some examples, billing module 318 may be configured to support various billing models such as a subscription-based billing model, a usage-based billing model, a purchase-based billing model, and/or a rental-based billing model.

Management subsystem 108 may be further configured to manage updates to software applications and/or corresponding services. An update may be initiated by a subscriber, a carrier, and/or a developer. For example, a developer may develop an updated version of a software application that is installed on access device 104. Develop interface module 302 may receive data representative of the update and/or updated software application from the developer (e.g., via a developer portal). Application management module 308 may process the received updated software application as described above. Once the updated software application is approved, management subsystem 108 may manage an updating of a previous version of the software application installed on one or more access devices. To illustrate, a previous version of the software application may be installed on access device 104. Management subsystem 108 may determine that access device 104 has the previous version of the software application installed and initiate a process to update the software application. To this end, management subsystem 108 may instruct access device 104 to uninstall the previous version of the software application. Once the previous version has been successfully uninstalled, management subsystem 108 may initiate a provisioning process to provision the updated software application and corresponding service for access by access device 104. The provisioning process may be performed as described above.

As another example, a subscriber may request a service change, such as an upgrade to an existing service delivered by application server 110 to access device 104. The service change may be provisioned as described above in relation to FIG. 5.

As another example, a carrier may request a service change, such as an upgrade or downgrade to an existing service delivered by application server 110 to access device 104. The service change may be provisioned as described above in relation to FIG. 5.

Figure 7:
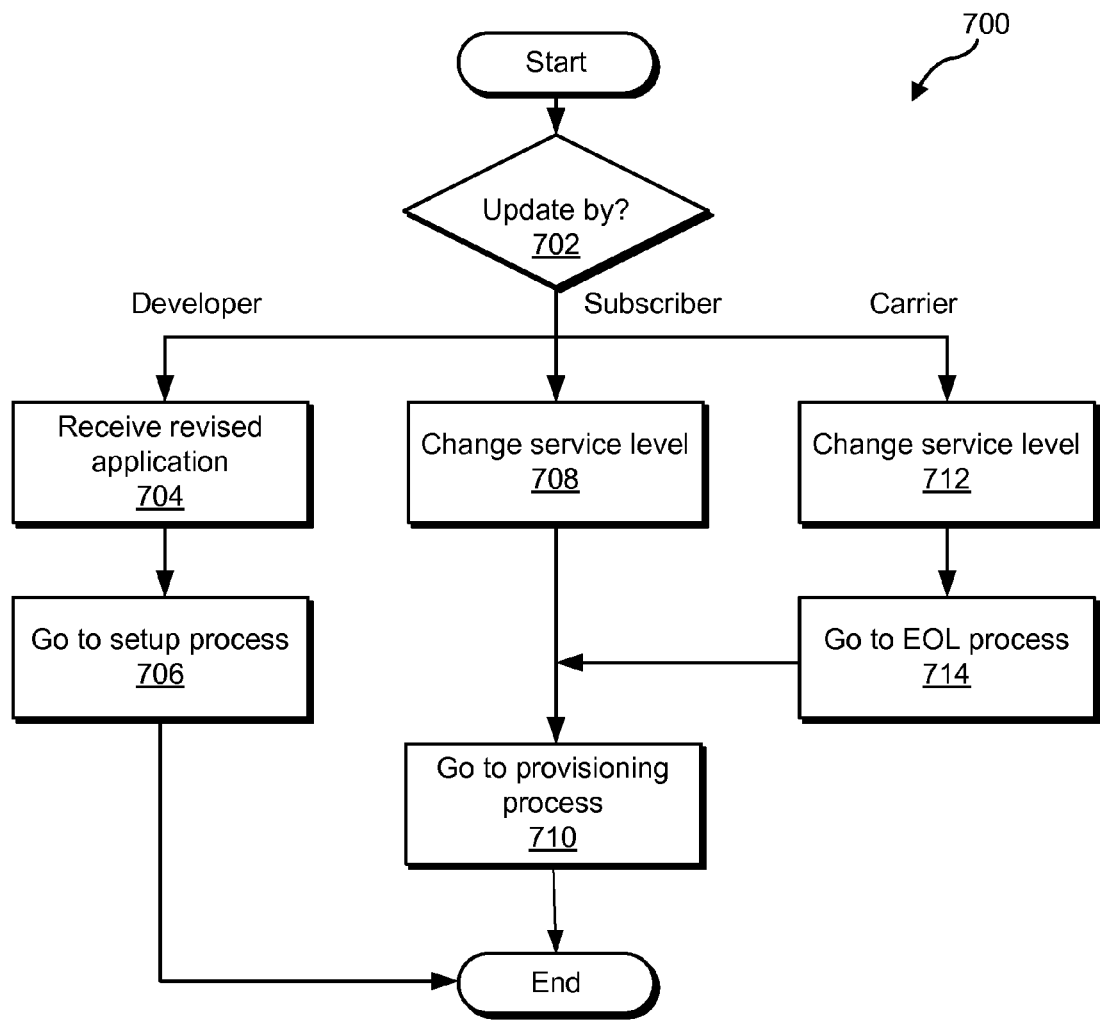
FIG. 7 illustrates an exemplary service upgrade method.

FIG. 7 illustrates and exemplary service update method 700. While FIG. 7 illustrates exemplary steps according to one embodiment, other embodiments may omit, add to, reorder, and/or modify any of the steps shown in FIG. 7. In certain embodiments, one or more of the steps shown in FIG. 7 may be performed by one or more components of management subsystem 108.

In step 702, a determination is made as to who requested a service update. For example, management subsystem 108 may determine from whom a service update request is received.

If a service update request is received from a developer, processing moves to step 704. In step 704, a revised software application is received. For example, developer interface module 302 may receive data representative of an updated software application from the developer.

In step 706, the setup process shown in FIG. 4 is initiated and performed to set up the updated software application as described above. Processing then ends.

Returning to step 702, if the service update request is received from a subscriber, processing moves from step 702 to step 708. In step 708, a service level is changed. For example, management subsystem 108 may update data representative of a service level associated with the subscriber. To illustrate, the subscriber may request an upgrade in a service being accessed by the subscriber. In step 708, the service level may be updated from the previous service level to the upgraded service level. In step 710, the provisioning process shown in FIG. 5 is initiated and performed as described above to update the service level for the subscriber.

Returning again to step 702, if the service update request is received from a carrier, processing movers from step 702 to step 712. In step 712, a service level is changed. For example, management subsystem 108 may update data representative of a service level associated with the subscriber. To illustrate, the carrier may request an upgrade or a downgrade in a service being accessed by the subscriber. In step 712, the service level may be updated from the previous service level to the upgraded or downgraded service level.

In step 714, an EOL process is initiated and performed. For example, a service termination process described further below in relation to FIG. 8 may be initiated and performed at step 714 to terminate access to an existing service. The termination of the service may prepare access device 104 for provisioning of the requested updated service.

Processing moves from step 714 to step 710. In step 710, the provisioning process of FIG. 5 is initiated and performed to provision the updated service. Processing then ends.

Management subsystem 108 may be further configured to manage termination of service delivery. Termination of a service may be initiated by a subscriber, a carrier, and/or a developer. For example, a subscriber may elect to terminate a service provided by application server 110. The subscriber may submit a request to terminate service via a service selection portal.

Management subsystem 108 may control termination of a service. The termination may include managed removal (a managed uninstall operation) of one or more associated software applications from access device 110 and corresponding updates to information maintained by management subsystem 108.

The termination of service may further include coordinating with application server 110, such as by transmitting a notification message to application server 110 to notify application server 110 of a termination of a service subscription. Accordingly, application server 110 may stop delivery of the service to access device 104.

The termination may further include coordination by management subsystem 108 with one or more backend facilities of service carrier facility 102. For example, carrier interface module 306 may transmit notification messages to a service selection portal, a subscriber management backend facility, an access device management backend facility, and/or a backend billing facility to notify of a termination of a service subscription and/or a removal of a software application from access device 104.

Figure 8:
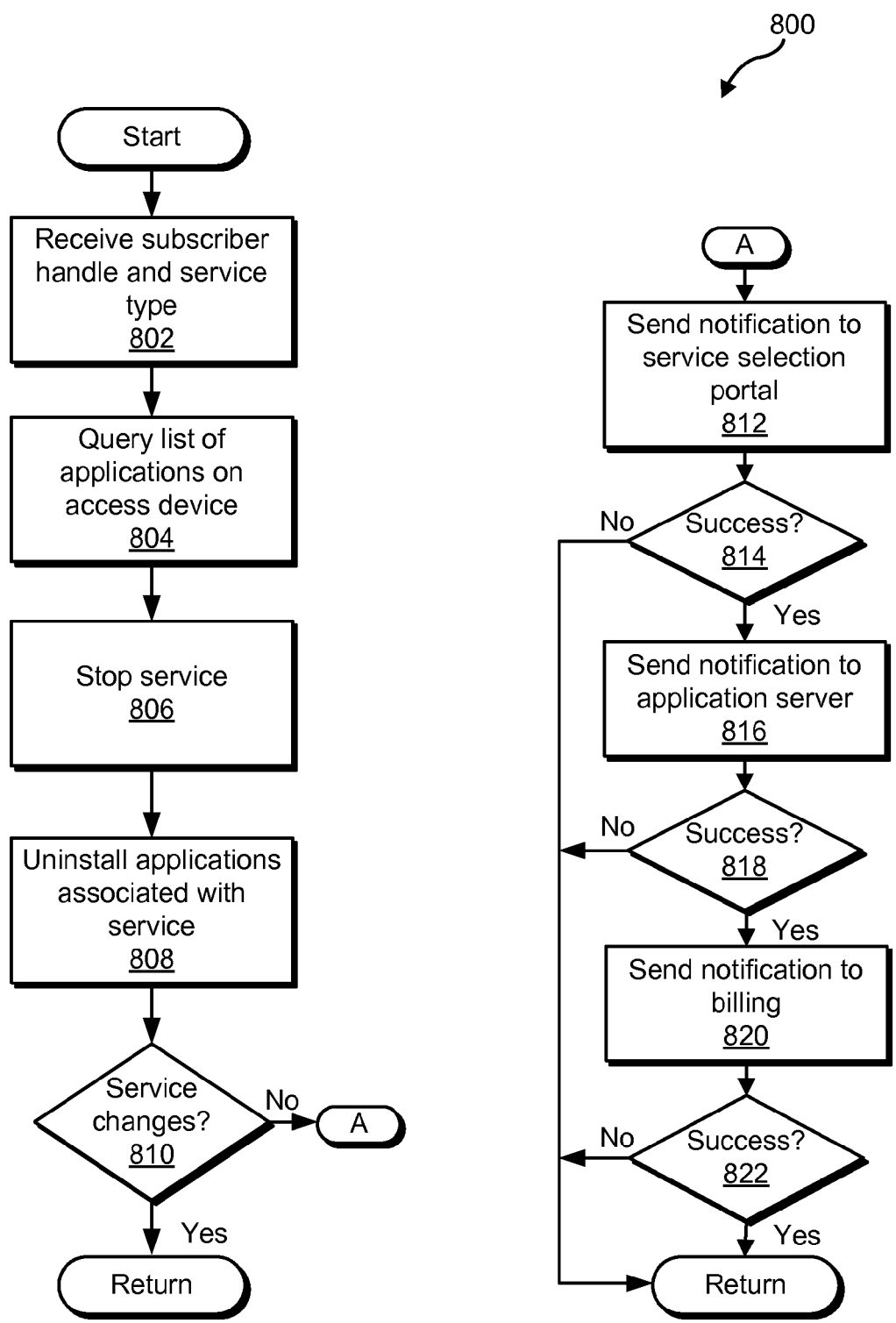
FIG. 8 illustrates an exemplary service termination method.

FIG. 8 illustrates and exemplary service termination method 800. The service termination method 800 may also be referred to as an end-of-life ("EOL") process. While FIG. 8 illustrates exemplary steps according to one embodiment, other embodiments may omit, add to, reorder, and/or modify any of the steps shown in FIG. 8. In certain embodiments, one or more of the steps shown in FIG. 8 may be performed by one or more components of management subsystem 108.

In step 802, a subscriber handle and service type are received. For example, management subsystem 108 may receive a subscriber handle and service type from an entity requesting a termination of service. The subscriber handle may identify a subscriber subscribing to the service, and the service type may identify a type of the service and/or specific service to be terminated.

In step 804, a list of applications installed on access device 104 associated with the subscriber is queried. For example, access device interface module 304 may communicate with access device 104 to determine the software applications installed on access device 104. As another example, application management module 308 may query data stored in application repository 312 to identify the applications installed on access device 104.

In step 806, service is stopped. Step 806 may be performed in any suitable way. For example, management subsystem 108 may instruct access device 104 to stop accessing the service.

In step 808, one or more software applications associated with the service to be terminated are uninstalled from access device 104. For example, management subsystem 108 may communicate with access device 104 and instruct access device 104 to uninstall one or more software applications associated with the service.

In step 810, a determination is made at as to whether the termination of service is part of a service change. If it is, termination method 800 may end and return to a process that called termination method 800. If the service termination is not part of a service change, processing may move from step 810 to step 812.

In step 812, a notification is sent to a service selection portal. For example, carrier interface module 306 may transmit a notification message to a service selection portal provided by service carrier subsystem 102. The notification to the service selection portal may be configured to notify the subscriber that the service has been successfully terminated and/or the associated software application(s) uninstalled from access device 104.

In step 814, a determination is made as to whether the service selection portal was successfully notified in step 812. If not, processing ends. Conversely, if the service selection portal was successfully notified in step 812, processing continues from step 814 to step 816.

In step 816, a notification message is sent to application server 110. For example, developer interface module 302 may transmit a notification message to application server 110 to notify application server 110 of a termination of a subscription to the service and/or of an uninstall of the corresponding software application(s).

In step 818, a determination is made as to whether application server 110 was successfully notified in step 816. If not, processing ends. Conversely, if application server 110 was successfully notified in step 816, processing continues from step 818 to step 820.

In step 820, a notification message is sent to billing. For example, application management module 308 and/or provisioning module 314 may inform billing module 318 of a termination of a subscription to the service and/or of an uninstall of the corresponding software application(s). As another example, carrier interface module 306 may transmit a notification message to a backend billing facility of service carrier subsystem 102 to inform the backend billing facility of a termination of a subscription to the service and/or of an uninstall of the corresponding software application(s).

In step 822, a determination is made as to whether billing was successfully notified in step 820. If not, processing ends. Conversely, if billing was successfully notified in step 820, provisioning of the selected service is successful and processing ends.

Figure 9:
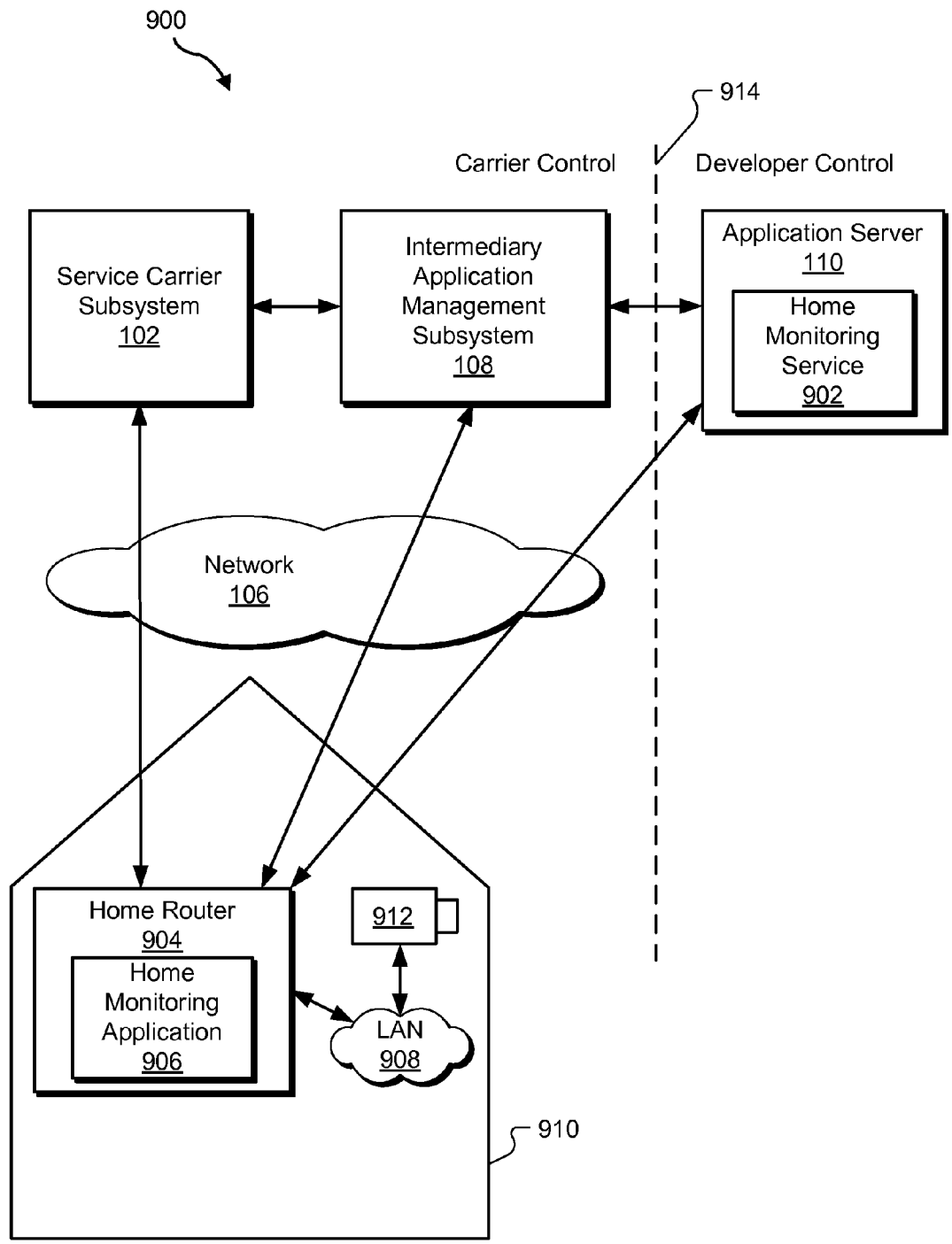
FIG. 9 illustrates another exemplary service delivery system.

FIG. 9 illustrates an exemplary service delivery system 900 (or simply "system 900") in which application server 110 is configured to deliver a home monitoring service 902 over network 106. As shown in FIG. 9, access device 104 may comprise a home router 904 configured to access home monitoring service 902 via network 106. A home monitoring application 906 may be installed and executed by home router 904 under the management and control of management subsystem 108, as described above, such that home router 904 may access home monitoring service 902.

Home router 904 may access one or more base service provided by service carrier subsystem 102. Hence, home monitoring service 902 may be an additional value-added service that is available to a subscriber associated with home router 904. In certain embodiments, a base service delivered by service carrier subsystem 102 to home router 904 may include a subscription television service (e.g., a broadcast or multicast television service) or a subscription Internet access service.

Home router 904 may have a central role in a local area network ("LAN") 908 located at a subscriber premises 910 (e.g., a subscriber's home). The central role of home router 904 in relation to LAN 908 located at subscriber premises 910 may be leveraged to support access of home monitoring service 902 at subscriber premises 910. For example, home router 904 may be configured to communicate with a surveillance camera 912 via LAN 908. As part of home monitoring service 902, camera 912 may capture and transmit a video feed to home router 904 via LAN 908. Home router 904 may in turn transmit the video feed to application server 110 via network 106, without the video feed passing through management subsystem 108. In addition, home router 904 may transmit camera control signals to camera 912 via LAN 908 to control one or more operations of camera 912. Examples of such camera controls may include, without limitation, camera tilt, pan, and zoom commands.

In certain embodiments, application server 110 may provide a user portal through which a subscriber to home monitoring service 902 may access and view the surveillance camera 912 video feed that has been provided to application server 110. The subscriber may utilize any suitable end-user access device to access the user portal and view the video feed. In addition, the subscriber may provide one or more camera control commands to the user portal. Application server 110 may receive and transmit the camera control commands to home router 904, which may forward the camera control commands to camera 912 via LAN 908. Camera 912 may respond accordingly by performing one or more operations.

As indicated by a demarcation 914 shown in FIG. 9, in certain examples, application server 110 may be controlled by a developer (e.g., a developer of home monitoring application 906 and a provider of home monitoring service 902), and service carrier subsystem 102, management subsystem 108, and home router 904 may be controlled by a carrier. Accordingly, the carrier may manage home monitoring service 902 and/or home monitoring application 906.

For example, management subsystem 108 may control a life cycle of home monitoring service 902, including setup, provisioning, delivery, upgrading, and/or terminating of home monitoring service 902, in any of the ways described above. Accordingly, home monitoring service 902 may be quickly and dynamically provisioned, delivered, controlled, upgraded, and/or terminated under the control of management subsystem 108 to provide an expanded service offering to home router 904.

Figure 10:
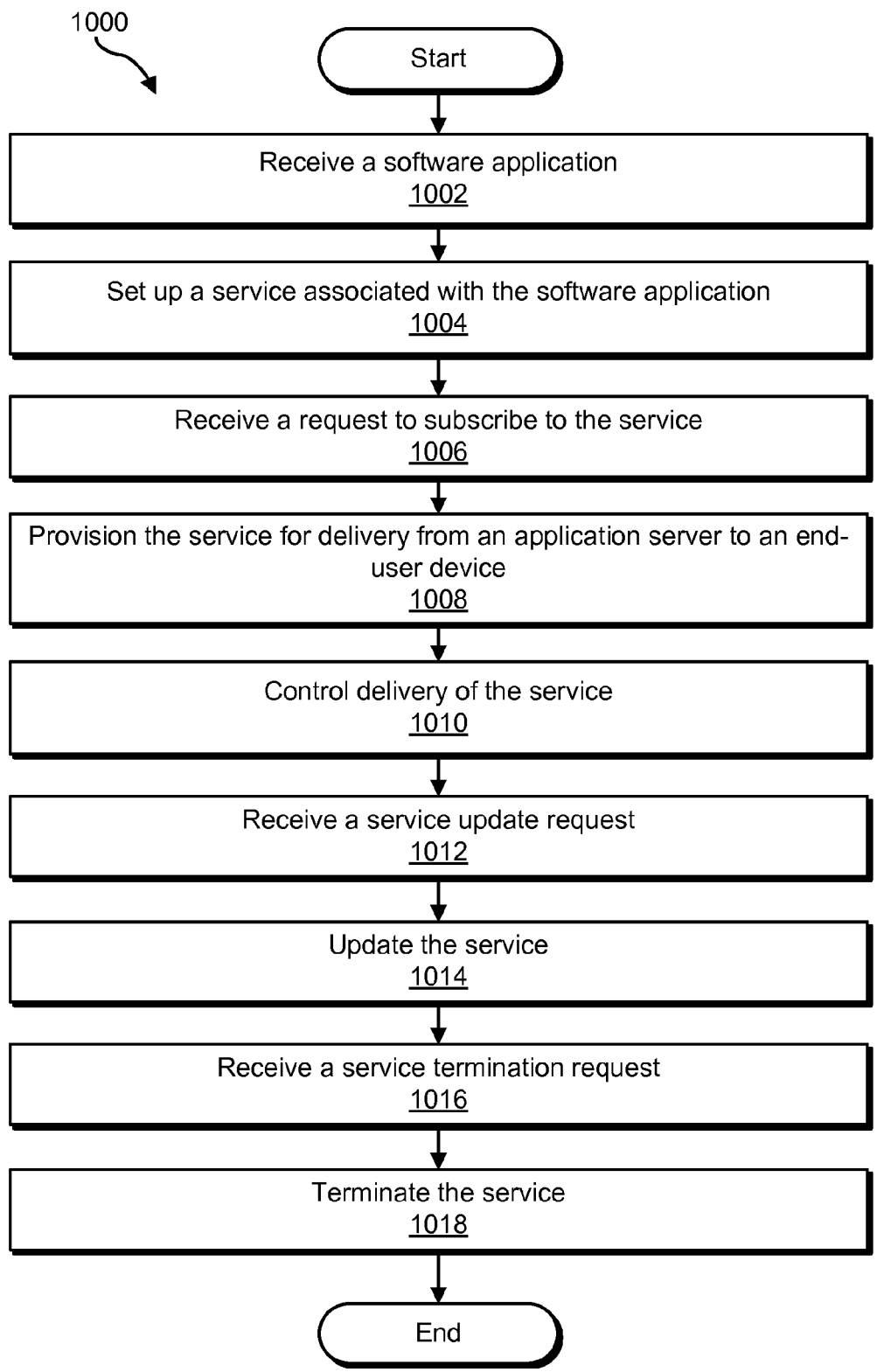
FIG. 10 illustrates an exemplary service life cycle management method.

FIG. 10 illustrates an exemplary service life cycle management method 1000. While FIG. 10 illustrates exemplary steps according to one embodiment, other embodiments may omit, add to, reorder, and/or modify any of the steps shown in FIG. 10.

In step 1002, a software application may be received. In step 1004, a service associated with the software application is set up for selection by one or more end-user access devices. In certain embodiments, step 1004 may include management subsystem 108 selectively approving the software application for distribution, storing the software application in applications repository 312, and providing information descriptive of the service associated with the software application to a service selection portal for inclusion in the service selection portal, which may be accessible by the end-user access devices. In step 1006, a request to subscribe to the service is received. In step 1008, the service is provisioned for delivery from an application server to an end-user access device in response to the request received in step 1006. In step 1010, delivery of the service is controlled. In certain embodiments, step 1010 may include monitoring delivery of the service such as by monitoring a usage of one or more resources of the end-user access device and controlling the delivery of the service by maintaining a predetermined level of availability of the resources for user by the end-user access device to provide a quality-of-service level for the service and/or for another service (e.g., a base service) accessible by the end-user access device. The service may be controlled based on the monitoring. In step 1012, a service update request is received. In step 1014, the service is updated in response to the request received in step 1012. In step 1016, a service termination request is received. In step 1018, the service is terminated in response to the request received in step 1016.

In certain embodiments, one or more of the steps shown in FIG. 10 may be performed by management subsystem 108 in any of the ways described herein to perform and/or control the setup, provisioning, delivery, updating, and/or termination of the service.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software), or combinations of computer-implemented instructions and hardware, configured to perform one or more of the processes described herein. In particular, system components may be implemented on one physical computing device or may be implemented on more than one physical computing device. Accordingly, system components may include any number of computing devices, and may employ any of a number of computer operating systems.

Accordingly, one or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, a DVD, any other optical medium, a RAM, a PROM, an EPROM, a FLASH-EEPROM, any other memory chip or cartridge, or any other tangible medium from which a computer can read.

Figure 11:
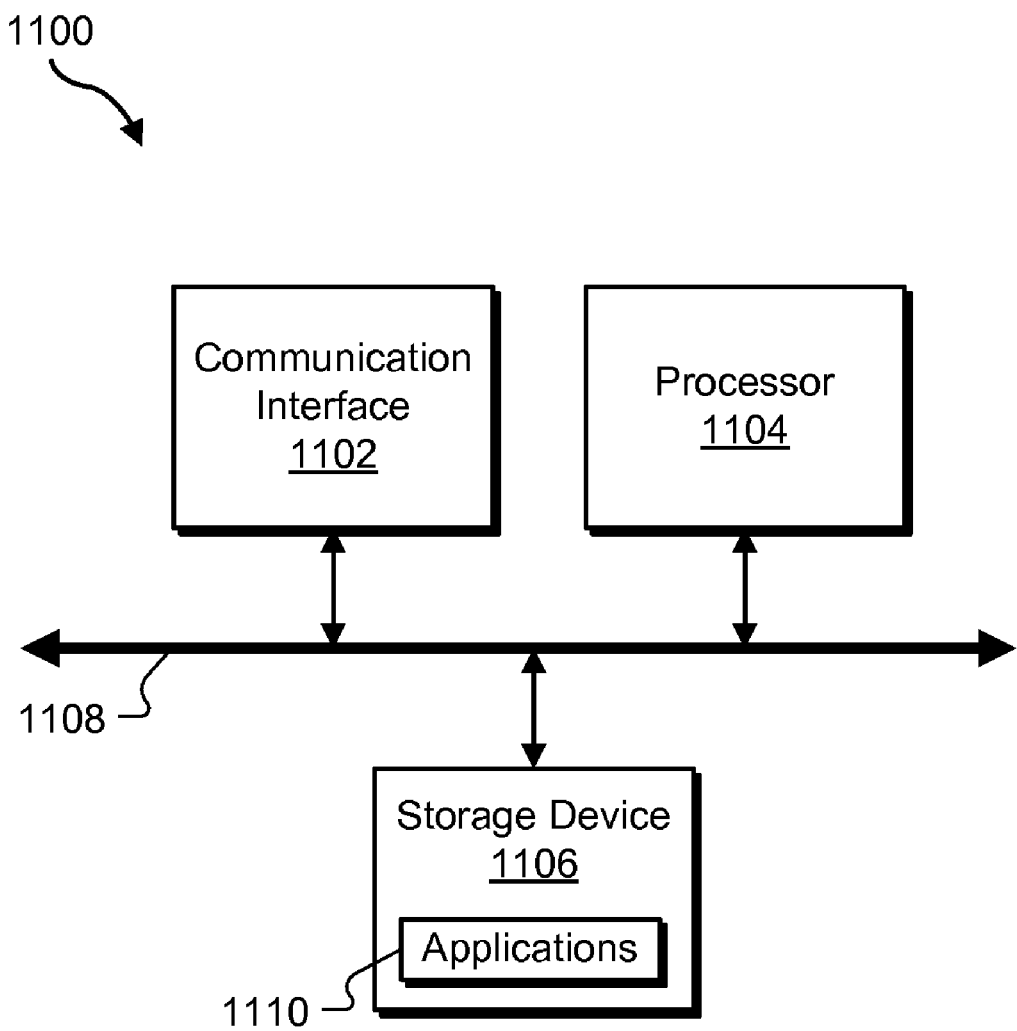
FIG. 11 illustrates an exemplary computing device configured to perform one or more of the processes described herein.

FIG. 11 illustrates an exemplary computing device 1100 configured to perform one or more of the processes described herein. As shown in FIG. 11, computing device 1100 may include a communication interface 1102, a processor 1104, and a storage device 1106 communicatively coupled one to another via a communication infrastructure 1108. The components of computing device 1100 may communicate with one another, including sending data to and receiving data from one another, using any suitable communication technologies.

Communication interface 1102 may be configured to communicate with one or more external computing devices. Examples of communication interface 1102 include, without limitation, a wired network interface (such as a network interface card), a wireless network interface (such as a wireless network interface card), a modem, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1110 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1106. For example, data representative of one or more executable applications 1110 configured to direct processor 1104 to perform any of the operations described herein may be stored within storage device 1106. In some examples, data may be arranged in one or more databases residing within storage device 1106.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
receiving, by an intermediary application management subsystem configured to communicate with an end-user access device and with an application server that is configured to deliver a service to the end-user access device, a software application configured to be executed by the end-user access device to access the service delivered by the application server;
setting up, by the intermediary application management subsystem, the service for selection by the end-user access device;
receiving, by the intermediary application management subsystem, a request to subscribe to the service delivered by the application server, the request initiated by the end-user access device; and
provisioning, by the intermediary application management subsystem in response to the request, the service for delivery from the application server to the end-user access device, the provisioning comprising
transmitting data representative of the software application to the end-user access device for installation and execution by the end-user access device, and
transmitting a notification message to the application server to notify the application server of an initiation of a subscription to the service by the end-user access device.

2. The method of claim 1, further comprising:
monitoring, by the intermediary application management system, the delivery of the service from the application server to the end-user access device; and
controlling, by the intermediary application management system, the delivery of the service from the application server to the end-user access device based on the monitoring.

3. The method of claim 2, wherein:
the monitoring comprises monitoring a usage of one or more resources of the end-user access device during the delivery of the service; and
the controlling comprises maintaining a pre-determined level of availability of the one or more resources of the end-user access device for use by the end-user access device to provide a quality-of-service level.

4. The method of claim 1, wherein the service is delivered from the application server to the end-user access device without going through the intermediary application management subsystem.

5. The method of claim 1, wherein the setting up comprises:

selectively approving the software application for distribution;
storing the software application in an applications repository; and
providing information descriptive of the service associated with the software application to a service selection portal for inclusion in the service selection portal, the service selection portal accessible by the end-user access device.

6. The method of claim 1, further comprising:
receiving, by the intermediary application management subsystem, a request to update the service; and
updating, by the intermediary application management subsystem, the service in response to the request to update the service.

7. The method of claim 1, further comprising:
receiving, by the intermediary application management subsystem, a request to terminate the subscription to the service; and
terminating, by the intermediary application management subsystem, the subscription to the service, the terminating comprising:
  uninstalling the software application from the end-user access device, and
  transmitting a notification message to the application server to notify the application server of the termination of the subscription to the service.

8. The method of claim 1, wherein the provisioning further comprises communicating with a service carrier subsystem configured to deliver one or more base services to the end-user access device to leverage one or more facilities of the service carrier subsystem to provision the service for delivery from the application server to the end-user access device.

9. The method of claim 8, wherein the one or more facilities of the service carrier subsystem comprise at least one of a backend billing facility, a backend provisioning facility, a subscriber management backend facility, and an end-user access device management facility.

10. The method of claim 1, wherein:
the service comprises a home monitoring service;
the software application comprises a home monitoring application; and
the end-user access device comprises a home router connected to a local area network at a subscriber premises.

11. The method of claim 1, embodied as computer-executable instructions on at least one tangible computer-readable medium.

12. A system comprising:
a carrier interface module configured to interface with a subscriber carrier subsystem that provides one or more base services for access by an end-user access device via a network;
an access device interface module configured to interface with the end-user access device;
a developer interface module configured to interface with an application server configured to deliver an additional service to the end-user access device;
an application management module communicatively coupled to the carrier interface module, the access device interface module, and the developer interface module and configured to set up the additional service for selection by the end-user access device; and
a provisioning module communicatively coupled to the carrier interface module, the access device interface module, and the developer interface module and configured to provision, in response to a request initiated by the end-user access device to subscribe to the additional service, the additional service for delivery from the application server to the end-user access device by
  initiating a transmission of data representative of a software application to the end-user access device for installation and execution by the end-user access device to access the additional service from the application server, and
  initiating a transmission of a notification message to the application server to notify the application server of an initiation of a subscription to the additional service by the end-user access device.

13. A system comprising:
a subscriber carrier subsystem that provides one or more base subscription services for access by an end-user access device via a network; and
an intermediary application management subsystem that interfaces with the service carrier subsystem, the end-user access device, and an application server configured to deliver an additional service to the end-user access device, wherein the intermediary application management subsystem
  receives a software application from a developer associated with the application server, the software application configured to be executed by the end-user access device to access the additional service configured to be delivered by the application server,
  sets up the service for selection by the end-user access device,
  receives a request to subscribe to the additional service configured to be delivered by the application server, the request initiated by the end-user access device, and
  provisions, in response to the request, the additional service for delivery from the application server to the end-user access device by
    transmitting data representative of the software application to the end-user access device for installation and execution by the end-user access device, and
    transmitting a notification message to the application server to notify the application server of an initiation of a subscription to the additional service by the end-user access device.

14. The system of claim 13, wherein the intermediary application management subsystem
monitors a usage of one or more resources of the end-user access device, and
maintains a level of availability of the one or more resources of the end-user access device for use by the end-user access device to provide a quality-of-service level.

15. The system of claim 13, wherein the additional service is delivered from the application server to the end-user access device without going through the intermediary application management subsystem.

16. The system of claim 13, wherein the intermediary application management subsystem
receives a request to update the additional service, and
updates the additional service in response to the request to update the additional service.

17. The system of claim 13, wherein the intermediary application management subsystem
receives a request to terminate the subscription to the additional service, and
terminates the subscription to the service by
  uninstalling the software application from the end-user access device, and transmitting a notification message to the application server to notify the application server of the termination of the subscription to the additional service.

18. The system of claim 13, wherein the intermediary application management subsystem communicates with the service carrier subsystem to leverage one or more facilities of the service carrier subsystem to provision the additional service for delivery from the application server to the end-user access device.

19. The system of claim 18, wherein the one or more facilities of the service carrier subsystem comprise at least one of a backend billing facility, a backend provisioning facility, a subscriber management backend facility, and an end-user access device management facility.

20. The system of claim 13, wherein:
the additional service comprises a home monitoring service;
the software application comprises a home monitoring application; and
the end-user access device comprises a home router connected to a local area network at a subscriber premises, the home router configured to communicate with a surveillance camera via the local area network at the subscriber premises.

21. The system of claim 13, wherein the one or more base subscription services comprises at least one of a subscription television service, a subscription mobile phone service, and a subscription Internet access service.

22. The system of claim 13, wherein:
the service carrier subsystem and the intermediary application management subsystem are controlled by a carrier;
the end-user access device is associated with a subscriber to the one or more base subscription services; and
the application server is controlled by a third-party.

* * * * *